United States Patent
Kourzanov

(10) Patent No.: US 10,455,584 B2
(45) Date of Patent: Oct. 22, 2019

(54) NETWORK NODE AND METHOD FOR IDENTIFYING A NODE IN TRANSMISSIONS BETWEEN NEIGHBOURING NODES OF A NETWORK

(71) Applicant: NXP B.V., Eindhoven (NL)

(72) Inventor: Petr Kourzanov, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/672,129

(22) Filed: Aug. 8, 2017

(65) Prior Publication Data

US 2018/0054825 A1 Feb. 22, 2018

(30) Foreign Application Priority Data

Aug. 11, 2016 (EP) ..................... 16183793

(51) Int. Cl.
*H04W 72/04* (2009.01)
*H04L 29/06* (2006.01)
*H04L 29/12* (2006.01)
*H04W 84/18* (2009.01)

(52) U.S. Cl.
CPC ..... *H04W 72/0466* (2013.01); *H04L 61/2092* (2013.01); *H04L 61/6081* (2013.01); *H04L 63/0428* (2013.01); *H04L 61/6022* (2013.01); *H04W 84/18* (2013.01)

(58) Field of Classification Search
CPC .............................. H04W 72/04; H04W 12/04
USPC .................................................. 370/328, 329
See application file for complete search history.

(56) References Cited

U.S. PATENT DOCUMENTS

| | | | |
|---|---|---|---|
| 5,745,699 A | 4/1998 | Lynn et al. | |
| 5,835,725 A | 11/1998 | Chiang et al. | |
| 5,920,566 A * | 7/1999 | Hendel | H04L 12/18 370/356 |
| 6,434,134 B1 | 8/2002 | La Porta et al. | |
| 7,451,312 B2 | 11/2008 | Medvinsky et al. | |
| 8,989,053 B1 * | 3/2015 | Skaaksrud | H04W 12/06 370/255 |
| 2006/0171387 A1 * | 8/2006 | Kang | H04L 29/12264 370/389 |
| 2007/0255653 A1 * | 11/2007 | Tumminaro | G06Q 20/10 705/39 |
| 2008/0092213 A1 | 4/2008 | Wei et al. | |
| 2008/0235336 A1 * | 9/2008 | Stern | G06Q 10/107 709/206 |
| 2009/0066543 A1 * | 3/2009 | Delia | G06F 3/023 341/23 |
| 2010/0272350 A1 * | 10/2010 | Lee | G06K 9/46 382/159 |

(Continued)

OTHER PUBLICATIONS

Anonymous: "Pseudorandom number generator—Wikipedia"; retreived from the Internet: https://en.wikipedia.org/w/index.php?title=Pseudorandom_number_generator&oldid=731738648; retreived Feb. 17, 2017).

(Continued)

*Primary Examiner* — Jinsong Hu
*Assistant Examiner* — Farideh Madani

(57) ABSTRACT

A network node for a wireless network comprises a processor, a memory and an antenna. The network node is operable to generate a random or pseudo-random number and to assign said number as an address for identifying said node to other nodes in said network.

15 Claims, 4 Drawing Sheets

(56) References Cited

U.S. PATENT DOCUMENTS

| | | | | |
|---|---|---|---|---|
| 2011/0026472 | A1* | 2/2011 | Reumerman | H04W 72/02 370/329 |
| 2011/0305232 | A1* | 12/2011 | Singamsetty | H04B 1/7143 370/338 |
| 2012/0066399 | A1* | 3/2012 | Marquardt | H04L 69/162 709/228 |
| 2012/0254958 | A1 | 10/2012 | Budampati et al. | |
| 2012/0264958 | A1 | 10/2012 | Kale et al. | |
| 2013/0260770 | A1* | 10/2013 | Landgren | H04W 8/04 455/445 |
| 2013/0326393 | A1* | 12/2013 | Namioka | G06F 3/0484 715/780 |
| 2014/0105211 | A1* | 4/2014 | Hui | H04L 45/02 370/392 |
| 2015/0006719 | A1 | 1/2015 | Gupta et al. | |
| 2016/0081133 | A1* | 3/2016 | Kim | H04L 63/0876 370/329 |
| 2017/0048700 | A1* | 2/2017 | Huang | H04W 12/04 |
| 2017/0235552 | A1* | 8/2017 | Tolhuizen | H04L 9/002 713/165 |

OTHER PUBLICATIONS

Cheshire, S; Apple, Inc.; IPv4 Address Conflict Detection; Network Working Group RFC 1717, Internet Society 4, Rue Des Falaises, CH-1205 Geneva, Switzerland, CH; 19 pages (Jul. 1, 2008).

Einarsson, G.; "Address Assignment for a Time-Frequency-Coded, Spread-Spectrum System"; The Bell System Technical Journal, vol. 59, No. 7; pp. 1241-1255 (Sep. 27, 1980).

Fang, Miaoqi et al; "A Preemptive Distributed Address Assignment Mechanism for Wireless Sensor Networks"; IEEE 4th International Conference on Wireless Communications, Networking and Mobile Computing; pp. 1-5 (2008).

Kim, Haeyong et al; "DAP: Dynamic Address Assignment Protocol in Mobile Ad-hoc Networks" 2007 IEEE International Symposium on Consumer Electronics; pp. 1-6 (2007).

Nakjung Choi, et al; "Random and linear address allocation for mobile ad hoc networks"; Wireless Communications and Network Conference, 2005 IEEE, New Orleans, LA, US; IEEE, Piscataway, NJ US; vol. 4; pp. 2231-2237 (Mar. 13, 2005).

Schurgers, Curt et al; "Distributed On-demand Address Assignment in Wireless Sensor Networks" IEEE Transactions on Parallel and Distributed Sytems, vol. 13, No. 10; pp. 1056-1065 (Oct. 2002).

Thoppian, Mansi Ramakrishnan et al; "A Distributed Protocol for Dynamic Address Assignment in Mobile Ad Hoc Networks"; IEEE Transactions on Mobile Computing, vol. 5, No. 1; pp. 4-19 (Jan. 2006).

Zhou, Hong et al; "Prophet Address Allocation for Large Scale MANETs"; 22nd Annual Joint Conference of the IEEE Computer and communications Socieities, vol. 2; pp. 1304-1311 (2003).

Mamiit, Aaron, "Apple implements random MAC address on iOS 8. Goodbye, marketers", Tech Times, Jun. 12, 2014, pp. 1-2, retrieved from the Internet at https://www.techtimes.com/articles/8233/20140612/appleŁimplements-random-mac-address-on-ios-8-goodbyeŁmarketers.htm , retrieved on Mar. 25, 2019.

* cited by examiner

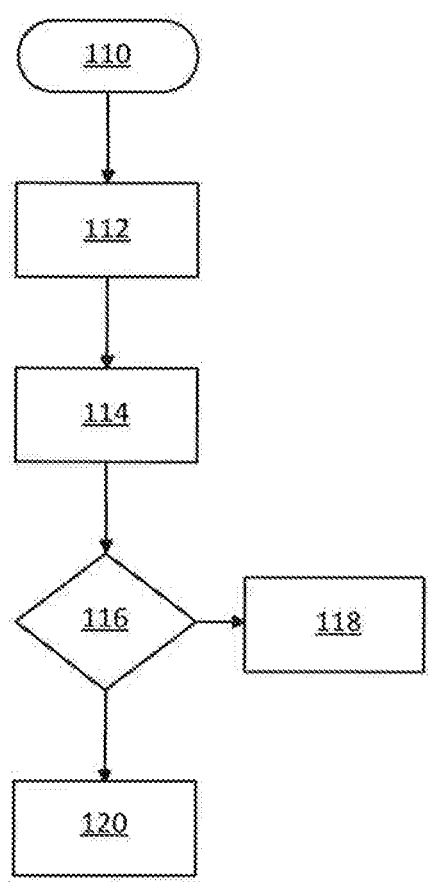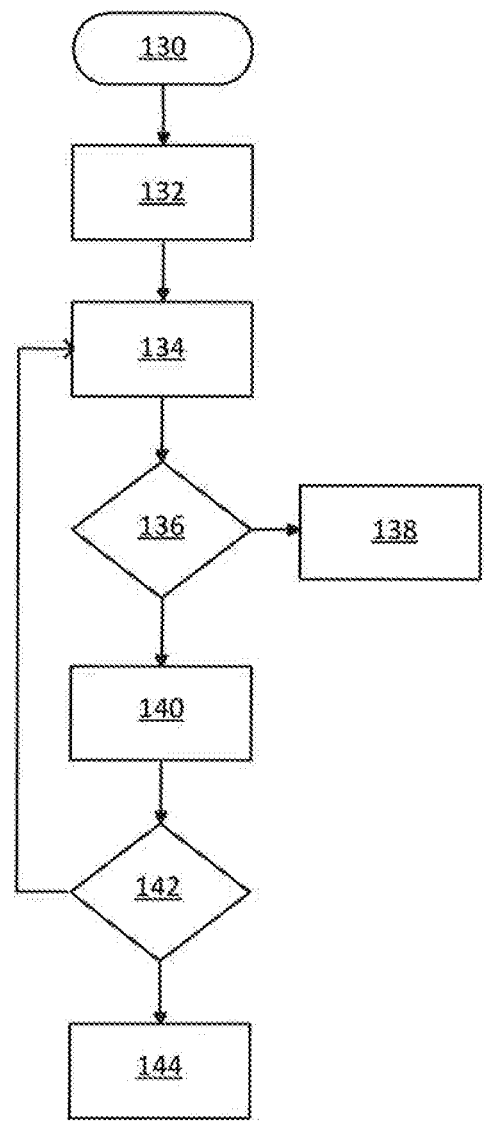
FIGURE 7                    FIGURE 8

NETWORK NODE AND METHOD FOR IDENTIFYING A NODE IN TRANSMISSIONS BETWEEN NEIGHBOURING NODES OF A NETWORK

CROSS-REFERENCE TO RELATED APPLICATIONS

This application claims the priority under 35 U.S.C. § 119 of European patent application no. 16183793.5, filed Aug. 11, 2016 the contents of which are incorporated by reference herein.

FIELD OF THE INVENTION

The present invention relates to a network node, a network and a method, and relates particularly but not exclusively to a network node and method for identifying a node in transmissions between neighbouring nodes of a network.

BACKGROUND OF THE INVENTION

Internet of things (IoT) scenarios are projected to involve many thousands of nodes operating in a large area, for example in a Smart City. IoT environments, such as wireless sensor network (WSN) installations, feature very challenging channel conditions. For example, IEEE 802.15.4 (ZigBee) communications use 16 channels in the 2.4 GHz ISM band that overlap with Wireless Fidelity (WiFi) and Bluetooth channels, which can lead to strong external interference. The scale of such installations also leads to congestion due to significant internal interference, for example among WSN nodes themselves. Thus a centralised, global management of the network may not be as effective or cost efficient as a more distributed, localised one.

Address management is an aspect of IoT networks that is particularly wasteful of resources. Addresses typically use fixed bit-widths. For example, a modern IoT installation requires 64-bit media access control (MAC)-level addresses, 16-bit network-level addresses and 128-bit Internet Protocol (IP) v6 addresses. Long addresses are used so that communication between every node of a network and every other node can be accommodated. Most of these addresses are allocated and/or checked centrally, for example at the network coordinator or router, and may be checked globally, for example to ensure MAC-address uniqueness. The upper layers of the IoT networking stack are required to allocate sufficient memory to accommodate a large number of these addresses, even when the actual deployment uses a much smaller range of addresses. During transmissions, some types of addresses are always quoted by the protocol stack, and for short range communications this is wasteful of resources, for example in terms of channel utilization and energy consumption.

In addition, nodes are essentially identified by such addresses. In particular, the intended recipient of a communication may be identified by a destination address. In some situations this may expose security-sensitive information to a potential attacker.

Preferred embodiments of the present invention seek to overcome one or more disadvantages of the prior art.

SUMMARY OF THE INVENTION

According to an aspect of the present invention there is provided a network node for a wireless network, the network node comprising a processor, a memory and an antenna, wherein the network node is operable to:

generate a random or pseudo-random number; and assign said number as an address of said node, for identifying said node to other nodes in said network.

According to another aspect of the invention, there is provided a method for identifying a network node in transmissions between neighbouring nodes of a network, the method comprising:

at said node, generating a random or pseudo-random number; and assigning said number as an address for identifying said node to other nodes in said network.

According to another aspect of the invention, there is provided a computer program for a network node, the computer program comprising:

first computer code for generating a random or pseudo-random number; and second computer code for assigning said number as an address for identifying said node to other nodes in said network.

The invention may thereby provide a scheme for distributed, localised addressing in networks. Addresses are allocated locally by the node itself, so there is no need for a node to query a remote server to obtain an address and there is no need to provide or retrieve an address to or from a central server specifically installed to perform address management. Local groups of nodes may dynamically assign addresses themselves. The present invention may reduce the length and number of addresses which need to be quoted during transmissions between nodes in a network, in particular during short-range communications, thereby conserving resources.

The network node may be operable to update said address prior to a transmission by said node, by replacing said address by a new random or pseudo-random number generated by said node.

By updating its address prior to a transmission, or prior to each transmission by the node, address assignment is dynamic, improving use of resources and increasing security of communications.

In some embodiments, said random or pseudo-random number is a sequence number generated by a pseudo-random number generator.

The network node may be operable to update said address by replacing said sequence number by a next sequence number generated by said pseudo-random number generator.

A pseudo-random number generator is an algorithm that deterministically generates a number based on an input state. Sequences of numbers generated by a PRNG are not truly random because they can be regenerated if the same initial state is used as an input. The PRNG generates the 'next' sequence number based on its current state (without reseeding the PRNG). The PRNG generates a new state each time it generates a new sequence number. These properties may be exploited in the present invention for tracking addresses used by the node or by other nodes in the network.

The pseudo-random number generator may exhibit bijective mapping between its state and corresponding sequence numbers.

Bijective mapping between states and sequence numbers may facilitate tracking of addresses used by the node or by other nodes in the network.

In some embodiments, the network node may be operable to broadcast or transmit a message to other nodes within range on the network, said message including said address and at least one characteristic of said node.

In this way, the node may communicate its address to other nodes in the network and identify itself as a possible communication partner to other nodes in the network.

Said characteristic may include a capability of the node, for example a sensing capability (e.g. a temperature or pressure sensing capability), or an actuating capability. Said characteristic may include a location of the node.

In some embodiments, the network node is operable to: generate a message for transmission to at least one second node; and insert said address of the first node into a header of said message.

In this way, the node may identify itself in transmissions to other nodes.

In some embodiments, the network node is operable to maintain a record relating to addresses used by said node.

The record may comprise addresses used by said node. This may be useful in determining whether a destination address used by another node corresponds to an address originally generated by the first node.

The record may comprise at least some states of said pseudo-random number generator corresponding to addresses used by said node.

By storing some or all states of the pseudo-random number generator corresponding to addresses used by said node, the node may be able to regenerate the addresses used by the node, the addresses being sequence numbers generated from the PRNG based on the states. It is not necessary to store all the states as the PRNG generates a next state each time a next sequence number is generated.

In some embodiments, the network node is operable to:
receive a message transmitted by a second node on said network;
extract a destination address from a header of said message; and
refer to said record to determine whether said extracted destination address corresponds to an address previously used said node.

If the node updates its address frequently, for example prior to every transmission, neighbouring nodes may not have knowledge of the node's current address, but only an old version of the node's address. By referring to its record, which may include the node's previous addresses or previous states from which the node's previous addresses may be regenerated, a node is able to determine whether a received message is addressed to itself.

The network node may determine whether said extracted destination address corresponds to an address previously used said node by comparing the extracted destination address with previous addresses of said node stored in said record.

The network node may determine whether said extracted destination address corresponds to an address previously used said node by:
(a) for a previous state stored in the record, seeding the PRNG with said previous state;
(b) using the PRNG to generate a next sequence number;
(c) if the sequence number generated in step (b) matches the extracted destination address, identifying said node as addressee of said message; and
(d) if a match is not found, repeating steps (b) to (d) up to a predetermined maximum number of times.

The steps (a) to (d) may be repeated for each stored previous state of the PRNG stored in the record.

Thereby, the node may attempt to fast-forward the PRNG from a state stored in said record to the destination address to determine whether the destination address corresponds to an address previously used by the node.

The network node may determine whether said extracted destination address corresponds to an address previously used said node by:
(a) seeding the PRNG with the extracted destination address or with a state re-mapped from the extracted destination address;
(b) using the PRNG to generate a next sequence number;
(c) if the sequence number generated in step (b) matches an address of said node, identifying said node as addressee of said message; and
(d) if a match is not found, repeating steps (b) to (d) up to a predetermined maximum number of times.

Thereby, the node may attempt to fast-forward the PRNG from the extracted destination address to the current (or recent) address of the node to determine whether the destination address corresponds to an address previously used by the node.

Said step of extracting said destination address may include decrypting said destination address.

In some embodiments, said network node is operable to:
generate a message for transmission to a second node;
encrypt a destination address of said second node; and
insert said encrypted destination address into a header of said message.

Encrypting destination addresses transmitted in messages by the node may be used to establish secure communication pairs. Encryption may be based on public key cryptography.

In some embodiments, a database of addresses of neighbouring nodes is stored in said memory of said network node, and said network node is operable to:
receive a message transmitted by a second node connected to the network;
extract a source address from a header of said message;
determine whether said source address is assigned to a neighbouring node having an entry in said database; and
if an extracted source address is determined to be assigned to a neighbouring node having a corresponding entry in said database, to replace the previous address of said neighbouring node in said database with said extracted source address.

The database may be an array and the memory may be a cache of said node. An entry in the database may associate an address of a neighbouring node with at least one characteristic of said neighbouring node (for example a capability or location of the node). By updating the address of a neighbouring node recorded in the database when an extracted source address is determined to be assigned to said neighbouring node, the node is able to use more recent addresses of neighbouring nodes in transmissions to those nodes. This in turn reduces the resources used at a node for storing and/or querying information relating to previous addresses used by the node.

Said message transmitted by said second node may be an acknowledgement of or a response to a message previously sent by said first node to said second node.

Said message may be received by the node operating in promiscuous mode. This may enable a node to update its database of addresses of neighbouring nodes more regularly, as it may update source addresses in the database based on source addresses extracted from transmissions between other nodes, rather than only from transmissions addressed to itself.

In some embodiments, the node may be operable to determine whether said source address is assigned to a neighbouring node having an entry in said database by:
(a) for a selected neighbouring node entered in the database, seeding the PRNG with the address of said selected neighbouring node or with a state remapped from the address of said selected neighbouring node;

(b) using the PRNG to generate a next sequence number;

(c) if the sequence number generated in step (b) matches the source address, determining that said extracted source address is assigned to said selected neighbouring node;

(d) if a match is not found, repeating steps (b) to (d) up to a predetermined maximum number of times;

(e) if a match is not found, repeating steps (a) to (e) for a different selected neighbouring node entered in the first database, until all neighbouring node addresses in said database have been checked.

Thereby, a node may attempt to fast-forward the PRNG from a known address of a selected neighbouring node to the extracted source address, to determine whether the extracted source address is associated with the selected neighbouring node. This may be repeated for all neighbouring nodes having an address entry in the database.

In some embodiments, said node is operable, on receiving a message indicating that it has assigned itself an address identical to that of another node, to restart its pseudo-random number generator using a different initial state or seed.

Thereby, a node is able to maintain the local uniqueness of addresses of neighbouring nodes to ensure that all nodes are identifiable. On re-starting its PRNG, the node may transmit or broadcast a message including its new address and at least one characteristic of the node. This may prevent other nodes from continuing to use old, potentially colliding, addresses of the node.

In some embodiments, said node is operable to: determine whether a second node and a third node are using the same address; and, if said determination is positive, transmit a collision alert to at least one of said second node and said third node.

Thereby, a node is able to identify and alert other nodes when a collision between addresses occurs. Identical addresses generated by PRNG may correspond to identical states of the PRNG (in particular if there is bijection between the state and sequence number of the PRNG), in which case the PRNG at each of the second node and third node will continue to generate colliding addresses until one or both of the second and third nodes re-starts its PRNG with a different initial state or seed. The node may broadcast said collision alert to all nodes in the network within range. This may usefully prevent other nodes from continuing to transmit messages to the second or third node until one of those nodes has communicated its new address.

According to a further aspect of the invention, there is provided a network node for a wireless network, the network node comprising a processor, a memory and an antenna, wherein said network node is operable to:

receive a message transmitted by a second node on said network;

extract a destination address from a header of said message; and refer to a record of addresses used by said network node to determine whether said extracted destination address corresponds to an address previously used said node.

According to a further aspect of the present invention there is provided a method for determining whether a message received by a network node via a wireless network is addressed to said node, the method comprising:

receiving a message transmitted by a second node on said network;

extracting a destination address from a header of said message; and referring to a record of addresses used by said network node to determine whether said extracted destination address corresponds to an address previously used said node.

According to a further aspect of the invention, there is provided a network node for a wireless network, the network node comprising a processor, a memory and an antenna, wherein said network node is operable to:

receive a message transmitted by a second node connected to the network;

extract a source address from a header of said message;

determine whether said source address is assigned to a neighbouring node having an entry in a database of addresses of neighbouring nodes stored in said memory of said network node; and if an extracted source address is determined to be assigned to a neighbouring node having a corresponding entry in said database, to replace the previous address of said neighbouring node in said database with said extracted source address.

According to a further aspect of the present invention there is provided a method for updating a database of addresses of neighbouring nodes of a network node in a wireless network, the method comprising:

receiving a message transmitted by a second node connected to the network;

extracting a source address from a header of said message;

determining whether said source address is assigned to a neighbouring node having an entry in a database of addresses of neighbouring nodes stored in said memory of said network node; and if an extracted source address is determined to be assigned to a neighbouring node having a corresponding entry in said database, replacing the previous address of said neighbouring node in said database with said extracted source address.

According to a further aspect of the present invention, there is provided a network comprising a plurality of nodes according to the first aspect of the invention.

Each node connected to the network may be programmed with the same pseudo-random number generator algorithm.

Said network may be a wireless sensor network or an Internet of Things installation.

BRIEF DESCRIPTION OF THE DRAWINGS

Embodiments of the present invention will now be described, by way of example only and not in any limitative sense, with references to the accompanying drawings, in which:

FIGS. 5, 6, 7 and 8 each show a method according to an embodiment of the invention.

DETAILED DESCRIPTION OF EMBODIMENTS

Figure 1:
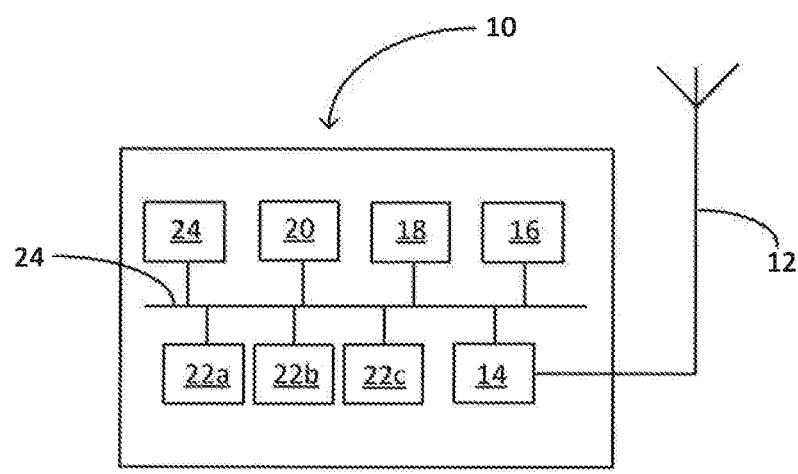
FIG. 1 shows a network node for a wireless network in accordance with an embodiment of the invention.

FIG. 1 shows a node 10 for a wireless network in accordance with an embodiment of the invention. The node 10 includes an antenna 12 for transmitting and receiving data over the network. The node 10 may also include an interface 14 including radio frequency components connected to the antenna 12 for processing incoming and outgoing signals. The node 10 may also include a processor 16 for processing data and controlling the operation of the node 10. The node 10 may also include a random number generator 18. The random number generator 18 may be implemented in hardware or in software. In the present embodiment, the random number generator 18 is in the form of a pseudo-random number generator (PRNG) but in other embodiments a random number generator generating real random numbers may be used. The node 10 may further include a memory 20 for storing data. The node 10 may also include one or more sensors 22a, 22b, 22c for use in a wireless sensor network (WSN). The node 10 may also include circuitry 24 for connection to one or more actuators. The various components of the node 10 may be connected together via a bus 26.

Figure 2:
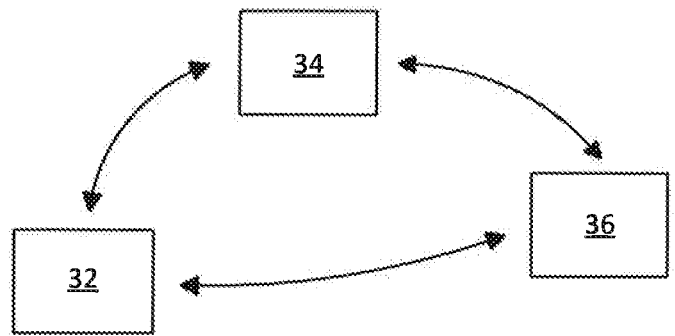
FIG. 2 shows a wireless network including a plurality of nodes in accordance with an embodiment of the invention.

FIG. 2 illustrates a wireless network 30 including a plurality of nodes 32, 34 and 36. Each of the nodes 32, 34, 36 may be nodes of the kind described above in relation to FIG. 1 and may receive and transmit data wirelessly to other nodes in the network 30. It will be appreciated that the wireless network 30 may in general include many more nodes than are shown in the present simplified example. For example, the network 30 may be included in an IoT installation and may include thousands or tens of thousands of nodes. The nodes of the network are not necessarily concentrated in a small area, such as a room, but may be spread out over a large area, such as a city. Therefore, each node may only be able to communicate with a small number of the total number of nodes in the network. The number of nodes within range will depend on the density of nodes and the communication range of each node. As an example, a node may have a transmission range of the order of 20 meters and may communicate directly with tens of neighbouring nodes. However the present invention is applicable to networks having various different configurations. In the network 30 shown in FIG. 2, it is assumed that the nodes 32, 34 and 36 are within communication range of each other.

When broadcasting messages on the network 30 or transmitting messages to another specific node 10 on the network 30, a node 10 identifies itself through an address that it includes in its communications. According to an embodiment of the present invention, each node 10 uses a pseudo-random number generator (PRNG) 18 to generate a pseudo-random sequence of numbers for use as that node's address. A node 10 is thereby identified not by a fixed address, but by a sequence number generated by the PRNG 18. Each time a node 10 transmits a message on the network, it uses the next sequence number of the PRNG sequence as its address. Therefore the address of a node 10 may change frequently. When transmitting a message to one or more other nodes 10 on a network 30, a node 10 inserts its current address (i.e. its current sequence number) in a source address field of the message header.

With reference to FIG. 3, the PRNG algorithm deterministically generates a sequence of numbers r0, r1, r2, r3, r4, . . . based on a state S0, S1, S2, S3, S4, . . . of the PRNG 18. Each node 10 therefore has its own state, which is updated by the PRNG algorithm each time a new sequence number is generated at that node 10. For a simple PRNG algorithm, such as a linear congruential generator (LCG), the state and sequence numbers coincide, such that the next state of the PRNG 18 depends on the last sequence number generated. By using a PRNG 18, the sequence of numbers generated is repeatable, and can be regenerated if the initial state or seed of the PRNG 18 is known. A PRNG 18 is used by each of the nodes 32, 34, 36 of the network 30. The PRNG algorithm and its implementation is the same at all nodes 32, 34, 36, but each node 32, 34, 36 seeds the PRNG 18 with a different initial state (e.g. a random number) so that each node 10 generates a different sequences of numbers. Selection of the appropriate bit-width for the sequence numbers may be guided by the parameters of the network, for example, the expected network density (the number of the nodes in range) and their expected transmission rates, and expected periodicity.

Figure 3A:
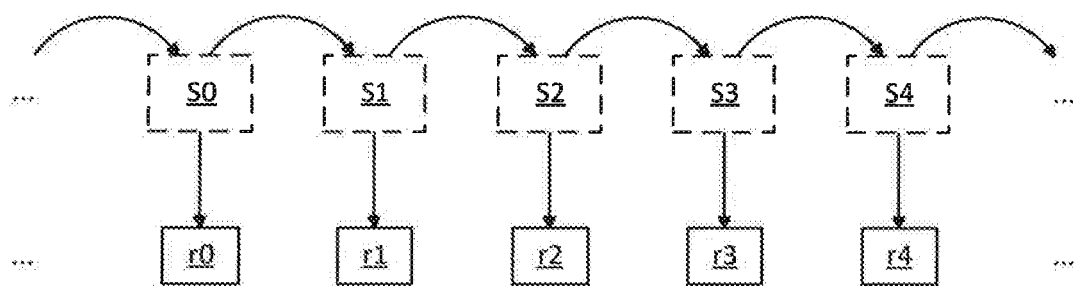
FIGS. 3A and 3B illustrate consecutive states and sequence numbers from a pseudo-random number generator.
Figure 3B:
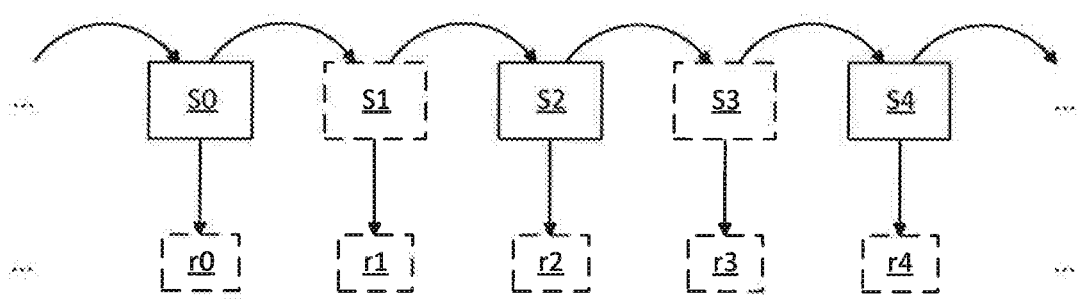

FIGS. 3a and 3b illustrate consecutive states S0, S1, S2, S3, S4, . . . and corresponding sequence numbers r0, r1, r2, r3, r4, . . . generated by a node 10 using the PRNG 18. Each node 10 maintains a record of the state of its PRNG 18, by indexing it by generated sequence numbers. For example, a node 10 may store the value of the state S0, S1, S2, . . . or the corresponding sequence number r0, r1, r2, . . . , or both. The record is stored in the memory 20 of the node 10, preferably in its cache. A node 10 may record the state or sequence number of its PRNG 18 for a given number of samples or for a given period of time, before deleting old samples and states to conserve memory. Alternatively, a bijective mapping may be enforced between the states and generated sequence numbers. This may be implemented in the PRNG 18 itself (for example, some simple PRNGs such as LCG are bijective by construction, since the state is identical to the random number), or as a device complementary to the PRNG.

FIGS. 3a and 3b illustrate two different strategies for maintaining a record of the sequence numbers used by a node 10. In FIG. 3a, the random numbers r0, r1, r2, r3, r4 . . . are stored, as indicated by the solid lines. The states S0, S1, S2, S3, S4, . . . of the PRNG 18 are not stored, as indicated by dashed lines. Since the PRNG 18 is an algorithm that deterministically generates a random number r0, r1, r2, . . . given a state S0, S1, S2, . . . , one does not need to store a sequence of potentially large state variables in order to regenerate a corresponding sequence of small random numbers. In FIG. 3b, instead of storing the random numbers r0, r1, r2, r3, r4 . . . themselves, a subset S0, S2, S4 . . . of the corresponding states of the PRNG 18 is stored. Since the mapping between states and random numbers is deterministic, the intermediate states S1, S3, . . . and all of the random numbers r0, r1, r2, r3, r4, . . . corresponding to the states S0, S1, S2, S3, S4, . . . 0 can be regenerated. For simplicity, FIG. 3b illustrates every second state S0, S2, S4, . . . being stored. However, in practice, the nodes 10 may be programmed to store, for example, one in every one hundred states. The approach taken in FIG. 3b trades off the storage space required for storing a long sequence of random numbers (as illustrated in FIG. 3a) with the time required to regenerate parts of that sequence from the stored subset of states.

Figure 4:
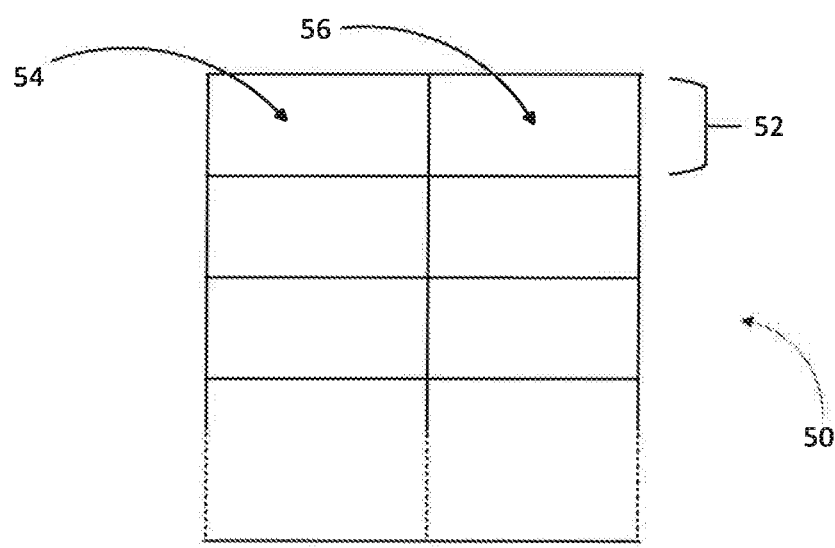
FIG. 4 illustrates a database of addresses.

Each node 10, 32, 34, 36 also maintains a database 50 of addresses of neighbouring nodes, in the form of an array 50, as shown in FIG. 4. The array 50 is stored in its memory 20, preferably in the cache, and maintained by processor 16. Each node 10 monitors the network 30 promiscuously, which means that each node 10 can process messages that are neither broadcast nor addressed to itself. Each node (e.g. node 32) monitors transmissions from neighbouring nodes (e.g. nodes 34, 36) within range on the network 30 and record observed source addresses in the database 50, together with semantic capability information that is periodically broadcast by each node 32, 34, 36 in the network 30. Thus each entry 52 in the database 50 contains at least one field 54 specifying a sequence number used as a source address by a neighbouring node 34, 36, and at least one further field 56 specifying information about the neighbouring node's capability (e.g. capability to sense temperature in a specified location). If a node 32 observes a new source address sequence number which it is able to attribute to a neighbouring node 34, 36 having an existing entry in its database 50, it updates the relevant entry 52 in the database 50 to reflect the new address of the neighbouring node 34, 36. Otherwise a new entry 52 may be created when a new source address is observed by the node 32. Each node's database 50 therefore contains the sequence number corresponding to the latest known address for each neighbouring node 34, 36 within range. Similarly, each neighbouring node 34, 36 capable of receiving packets from a node 32 will contain an entry for that node 32 in its database 50. To save space in the memory 20, a node 10 may discard entries 52 in the database 50 which are older than a certain predetermined period of time. The nodes 10 use their respective databases 50 of addresses of neighbouring nodes to identify possible communication partners.

Figure 5:
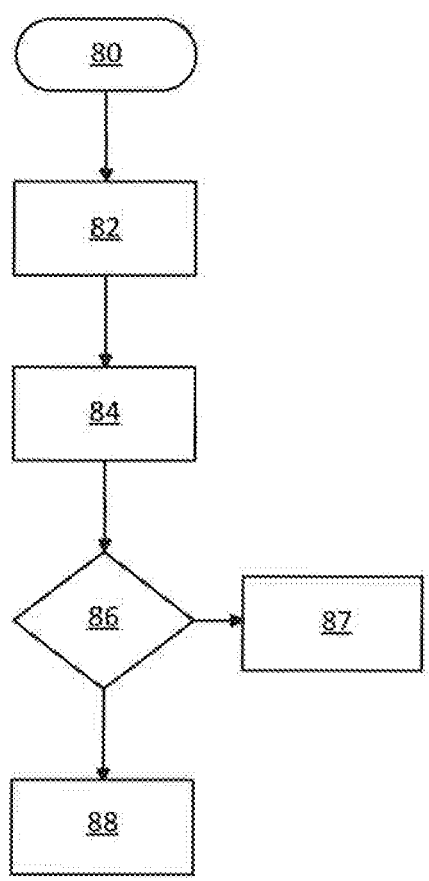

FIG. 5 illustrates a method of updating a database 50 of addresses of neighbouring nodes according to an embodiment of the invention. The method may be implemented by a network node (e.g. node 36) according to an embodiment of this invention, such as the node 10 of FIG. 1 in a wireless network 30 of the kind shown in FIG. 2. The method starts at step 80, at which point the network node 36 is promiscuously monitoring network traffic on the network 30. For example in the network 30 shown in FIG. 2, node 36 may observe transmissions sent by node 32 to node 34 or to other nodes. The node 36 may, where the network 30 includes further nodes that are within its range, also monitor transmissions sent by those further nodes. In a next step 82, the node 36 receives a message, in the form of a packet transmitted by a neighbouring node 34 on the network 30. At step 84, the node 36 extracts the source address from the packet by inspecting a source address field in the header of the packet. At step 86, the node 36 determines whether the extracted source address is associated with a neighbouring node (e.g. node 32) having an entry in the database 50 of neighbouring nodes stored in the memory 20 of node 36. If it is, the method proceeds to step 87 and the corresponding entry 52 in the database 50 is updated to replace the last known address of that neighbouring node 32 with the new address, i.e. the extracted source address. Otherwise, the method terminates at step 88. If the database 50 of node 36 did not include an entry 52 for the node 32 corresponding to the extracted source address, the node 36 may create a new entry in the database 50 for the node 32.

Figure 6:
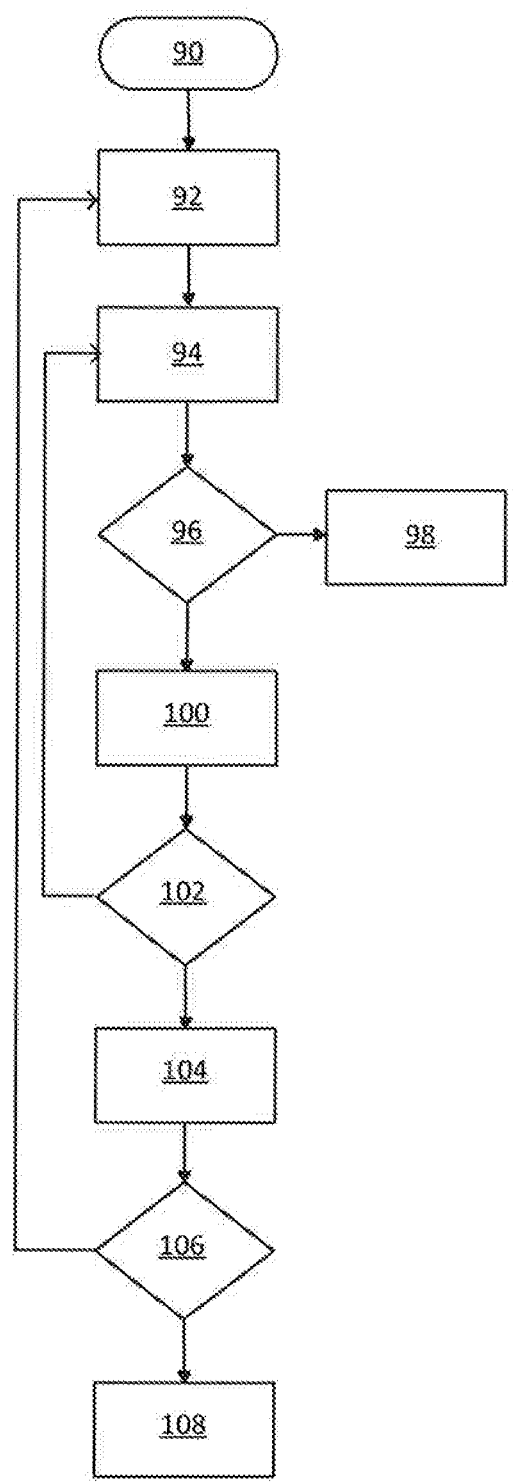

FIG. 6 shows a method for determining whether an extracted source address is associated with a neighbouring node 32 having an entry in the database 50 of a node 36, in the special case in which sequence numbers generated by the PRNG 18 are identical to the corresponding states of the PRNG 18 (i.e. a simple PRNG such as LCG), according to an embodiment of the invention. At step 90, the node 36 initialises counters i and j, with values i=0 and j=0 respectively. At step 92, the node 36 seeds its PRNG 18 with the latest known address (corresponding to the sequence number and state) of an ith neighbouring node, obtained from the ith entry 52 in its database 50 of addresses of neighbouring nodes 34, 36. At step 94, the next sequence number is generated by the PRNG based on the seeded state value. At step 96, this value is compared with the extracted source address. If there is a match, the node 36 determines that the extracted source address is associated with the ith neighbour (e.g. node 32) and the method proceeds to step 98, at which the ith entry 52 in the database 50 of addresses of neighbouring nodes is updated to replace the last known address with the new address, the extracted source address. If, at step 96, the values do not match, the method proceeds to step 100, at which the counter j is incremented by 1. At step 102, the value of the counter j is compared with a predetermined maximum value j_max. If j<j_max, the method returns to step 94 to generate the next sequence number based on the preceding state value. In this way, the node 36 attempts to "fast-forward" the PRNG 18 from the last known address of a neighbouring node i (up to a maximum number j_max of samples) to check if the extracted source address was generated by the neighbouring node i. An appropriate value of j_max is selected based on parameters of the network, such as the expected transmission rates of the nodes 10 and the expected periodicity of the PRNG 18.

If, at step 102, the value j has reached the value j_max, the method proceeds to step 104, at which the counter i is incremented by 1. At step 106, the value of the counter i is compared with the value i_max, corresponding to the number of entries in the database 50 of addresses of neighbouring nodes. If the counter i is smaller than i_max, the method returns to step 92 and repeats the procedure by seeding the PRNG 18 with the last known address of the next neighbouring node having an entry 52 in the database 50. If at step 106, the value of i has reached the value i_max, the method terminates at step 108. Note that the state of the PRNG 18 is reset to its value prior to execution of the method of FIG. 6 before any further sequence numbers are generated for use as addresses of the node 32.

Although FIG. 6 illustrates a method which can be used in the special case in which sequence numbers generated by the PRNG 18 are identical to the corresponding states of the PRNG 18, it may also be applicable in a modified form to other PRNGs where there is bijection between the state of the PRNG and the generated sequence numbers. In that case, it may be possible to remap the observed source sequence numbers to a state, and thus to fast-forward the PRNG 18 in the same way from the remapped state to check if the extracted source address was generated by a neighbouring node 32 having an entry 52 in the database 50 of addresses of neighbouring nodes.

The method described above with reference to FIG. 6 may not be applicable to all networks 30, depending on the type of PRNG 18 used. However, in all cases, and also including other embodiments in which truly random numbers are used, a node 32 may also update an address database entry corresponding to a neighbouring node 34 following packet exchange between the two nodes 32, 34. This will be described below. Updating the database 50 of addresses of neighbouring nodes as illustrated in FIG. 6 may be advantageous in limiting caching of source addresses or PRNG states at each node (as discussed with reference to FIG. 3) since any transmission from a source node (and not only to a certain destination node) will cause all neighbour nodes 34, 36 in range to update their source address registrations for that node 32.

It is assumed that nodes transmit packets often enough such that the sequence numbers generated by the PRNG 18 of each node regularly leak into the environment for effective distributed maintenance of the database of addresses of neighbouring nodes.

As an example of transmission and reception between nodes 32, 34, 36 of the network 30 of FIG. 2, we will consider a scenario in which node 32 transmits a message, in the form of a packet transmission, for reception by node 34. Node 32 (the source node) executes the PRNG 18 to update its state and generate a new sequence number, which is assigned as its new address. Node 32 inserts this sequence number into a source address field of the packet header. The node 32 also looks up the sequence number corresponding to the address of node 34 (the destination node) in its database of addresses of neighbouring nodes. If a match is found, node 32 inserts this sequence number into a destination address field of the packet header. In some embodiments, the node 32 may encrypt the sequence number of the destination address (e.g. using public key encryption). If no match is found, the source node 32 resorts to a routing procedure by looking up a default destination address. A default router or concentrator may have greater resources (memory, PRNG accelerators, etc.) providing extended capabilities for tracking addresses inside larger networks in range and/or connecting to other networks.

The packet transmitted by source node 32 is received by all neighbouring nodes (including nodes 34, 36) monitoring the network in promiscuous range within range of node 32. Each node 34, 36 receiving the packet extracts the destination address from the destination address field of the packet header and determines whether the destination address belongs to the receiving node 34, 36. In the case in which the source node 32 encrypted the destination address before inserting the destination address into the packet header, only nodes capable of decryption of the encrypted destination address are able to establish association with the original sequence number (i.e. the address of the destination node 34). When public key encryption is used to encrypt the destination address at the source node 32, the receiving node 34 decrypts the destination address using its own private key.

FIG. 7 shows a method for addressee detection according to an embodiment of the invention. The method may be implemented by a network node 32, 34, 36 according to an embodiment of the invention, such as the node 10 of FIG. 1, in a network 30 of the kind shown in FIG. 2. As an example, we will again refer to node 34 as destination node. The method starts at step 110, at which the node 34 is promiscuously monitoring the network. At step 112, the node 34 receives a message through the network 30. At step 114 the node 34 extracts the destination address from the packet header. In cases in which the destination address is encrypted by the transmitting node 32, the step 114 of extracting the destination address also includes decrypting the destination address. At step 116, the node 34 determines whether the message is addressed to itself based on the extracted destination address. If the extracted destination address is associated with the receiving node 34, the method proceeds to step 118, at which the message is processed. The node 34 may also send an acknowledgment or a response to the source node 32. If, at step 116, it is determined that the extracted destination address is not associated with the receiving node 34, the method terminates at step 110.

Various methods may be used by the nodes 10 to determine whether an extracted destination address is associated with itself (as at step 116 above). The selected method may depend on the type of PRNG 18 used by nodes 10 on the network 30, and the method used by that node to track state values of its PRNG 18 and/or the corresponding sequence numbers used as its address.

In cases in which a node 10 maintains a record of all sequence numbers it uses as its address (as illustrated in FIG. 3a), the node 10 may query its record of sequence numbers stored in memory 20 to determine whether any match with the extracted destination address. If one of the recorded sequence numbers r0, r1, r2, . . . matches the extracted destination address, the node 10 determines that the received message is addressed to itself and processes the message accordingly. This method is also applicable in other embodiments in which a node generates real random numbers for use as its address.

In cases in which a node 10 maintains a record of at least some of its PRNG states (as illustrated in FIG. 3b), the node 32 may fast forward its PRNG 18 from at least one stored state S0, S1, S2, . . . to regenerate previously used sequence numbers. The regenerated sequence numbers (each one corresponding to an address previously used by the node 10) are each compared with the extracted destination address. If one of the regenerated sequence numbers matches the extracted destination address, the node 10 determines that the message is addressed to itself and processes the message accordingly.

FIG. 8 illustrates another method for determining whether an extracted destination address is associated with the receiving node, in the special case in which sequence numbers generated by the PRNG 18 are identical to the corresponding states of the PRNG 18 (i.e. a simple PRNG such as LCG), according to an embodiment of the invention. The method starts at step 130, at which step the node 34 initialises counter j with value j=0. At step 132, the node 34 seeds its PRNG 18 with the extracted destination address. At step 134, the next sequence number is generated by the PRNG 18, based on the seeded state value. At step 136, this sequence number is compared with the current address (or a recent address) of the node 34. If there is a match, the node 34 determines that the packet is addressed to itself and proceeds to step 138 to process the message accordingly. If, at step 136, the values do not match, the method proceeds to step 140, at which the counter j is incremented by 1. At step 142, the value of counter j is compared with a pre-determined maximum value j_max. If j<j_max, the method returns to step 134 to generate the next sequence number based on the preceding state value of the PRNG 18. If, at step 142, it is determined that the counter j has reached its maximum value j_max, the method terminates at step 144. In this way, the node 34 attempts to fast-forward the PRNG 18 (up to a maximum number j_max of samples) from the extracted destination address to check whether the generated sequence of numbers includes the current address of the receiving node 34, thereby indicating that the extracted destination address is an address previously used by the receiving node 34. An appropriate value for j_max may be selected based on parameters of the network, such as the expected transmission rates of the nodes and the expected periodicity of the PRNG 18. Note that the state of the PRNG 18 is reset to its value prior to execution of the method of FIG. 8 before any further sequence numbers are generated for use as addresses of the node 34.

Although FIG. 8 illustrates a method which can be used in the special case in which sequence numbers generated by the PRNG 18 are identical to the corresponding states of the PRNG 18, it may be applicable in a modified form to other PRNGs where there is bijection between the state of the PRNG 18 and the generated sequence numbers. In that case, it may be possible to remap the extracted destination address sequence numbers to a corresponding state, and thus to fast-forward the PRNG 18 in the same way from the remapped state to check if the extracted destination address corresponds to a previously used address of the receiving node 34.

When a receiving node 34 receives a message addressed to itself, it may send an acknowledgement to the source node 32 which originally transmitted the message. The receiving node 34 will insert the source address extracted from the received message (i.e. the address of the node 32 originating the message) as the destination address for the acknowledgement. The receiving node 34 will also generate a new sequence number for use as its own address which it will include as source address in the acknowledgement. Upon receipt of the acknowledgment, the originating node 32 will extract the destination address and determine that the acknowledgement is addressed to itself. By matching the acknowledgment with the originally transmitted message, the originating node 32 will associate the source address extracted from the acknowledgement with the node 34 to which it addressed the original message, and will accordingly update the address of the acknowledging node 34 in its database 50 of addresses of neighbouring nodes. A corresponding process may be used to update the database 50 of addresses when the receiving node 34 sends a response (rather than an acknowledgement) to the source node 32 which originally transmitted the message.

The randomness condition is monitored to ensure that nodes 10 remain identifiable throughout all communications. Because the PRNG 18 is assumed to be re-startable (i.e., not entirely random), a collision in one generated sequence number would imply collapse of the randomness condition. In situations in which encryption is applied, packets received at a node (e.g. node 36) having an address colliding with the destination address of the intended receiver node (e.g. node 34) would simply be ignored since the node 36 having the colliding address would be unable to decrypt the destination address. In situations where two nodes 34, 36 with colliding addresses are within range, one of the nodes 34, 36 may be able to detect the collision, for example if it receives a message relating to a capability it does not possess. In other situations, a neighbouring node 32 may detect a collision between addresses of two other nodes 34, 36 within range via the source addresses and broadcast a collision announcement. After detection of a collision, a node 34, 36 having a colliding address will reseed its PRNG using a random number and proceed as normal, by broadcasting its new address and its capabilities.

The present invention may be used in large-scale IoT and WSN scenarios where communicating pairs of nodes may be required to be partially concealed using cryptographic methods. As discussed above, a source node 32 may scramble or encrypt a destination address (in addition to regular encryption of the payload) before inserting it into the destination address field of a packet and transmitting the packet. A potential attacker node may 'sniff' the network and observe all packets transmitted on the network (including packets broadcast by nodes and packets addressed to a specific node or group of nodes). A potential attacker would be capable of observing non-scrambled (non-encrypted) source addresses and would therefore be able to correlate distinct transmissions from the same node 32, but not to the same destination (e.g. node 34). A potential attacker would also be able to observe scrambled or encrypted destination addresses, but would not be able to associate the observed addresses with the corresponding destination nodes without simultaneous physical access to all nodes in the network. By being physically close to a receiving node 34, an attacker node may be able to observe the packets addressed to that node 34 and identify the destination node 34 by, for example, tracking signal power of the node 34. However, an attacker node would not be able to monitor all nodes simultaneously to cross-correlate physical transmission parameters (such as timestamp, signal power, sequence numbers) with captured packets.

Although in the embodiments described above, a node uses a PRNG 18 to generate random numbers for use as an address for identifying the node in transmissions between neighbouring nodes of a network, it will be appreciated that real random numbers may also be used. In that case, each node may store a record of the random numbers used as its address (up to a maximum number of addresses, or for a predetermined period of time), and may query this record to identify whether it is the addressee of any messages received while promiscuously monitoring messages transmitted on the network. Each node may also maintain a database of addresses of neighbouring nodes, which it may update based on broadcasts from neighbouring nodes or following message exchange between two neighbouring nodes.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A network node for a wireless network, the network node comprising
    a processor;
    a memory; and
    an antenna, wherein the network node is configured to
        generate a pseudo-random number, wherein the pseudo-random number generator is a sequence number generated by a pseudo-random number generator (PRNG) applying a PRNG algorithm,
        assign said pseudo-random number as an address to identify said network node with local uniqueness to other nodes in said wireless network, wherein each node has an identical PRNG algorithm and seeds the identical PRNG algorithm with a different initial state; and
        update the address prior to each transmission by the network node by replacing a current sequence number by a next sequence number generated by the pseudo-random number generator.

2. The network node according to claim 1, wherein said network node is configured to broadcast or transmit a message to other nodes within range on the wireless network, said message including said address and at least one characteristic of said network node.

3. The network node according to claim 1, wherein said network node is configured to maintain a record relating to addresses used by said network node.

4. The network node according to claim 3, wherein said record comprises at least some states of said pseudo-random number generator corresponding to addresses used by said network node.

5. The network node according to claim 3, wherein said network node is configured to
    receive a message transmitted by a second node on said wireless network,
    extract the destination address from a header of said message, and
    refer to said record to determine whether said extracted destination address corresponds to an address previously used by said network node.

6. The network node according to claim 1, wherein said network node is configured to
    generate a message for transmission to a second node,
    encrypt a destination address of the second node, and
    insert said encrypted destination address into a header of said message.

7. The network node according to claim 1, wherein a database of addresses of neighboring nodes is stored in said memory of said network node, and said network node is configured to
receive a message transmitted by a second node connected to the wireless network,
extract a source address from a header of said message,
determine whether said source address is assigned to a neighboring node having an entry in said database, and after an extracted source address is determined to be assigned to a neighboring node having a corresponding entry in said database,
replace the previous address of said neighboring node in said database with said extracted source address.

8. The network node according to claim 1, wherein said network node is configured, on receiving a message indicating that it has assigned itself an address identical to that of another node, to restart the pseudo-random number generator using a different initial state or seed.

9. The network node according to claim 1, wherein said network node is configured to:
determine whether a second node and a third node are using the same address; and, after said determination is positive,
transmit a collision alert to at least one of said second node and said third node.

10. The network node according to claim 1, wherein the wireless network is a wireless sensor network.

11. The network node according to claim 10, wherein said wireless network is an Internet of Things installation.

12. The network node of claim 1, wherein the pseudo-random number generator exhibits bijective mapping between its state and corresponding sequence numbers.

13. The network node of claim 9, wherein the network node is configured to transmit the collision alert to all nodes in the wireless network within range.

14. The network node of claim 9, wherein the network node is configured to detect a collision after receiving a message relating to a capability that the network node does not possess.

15. A method for identifying a node in transmissions between neighboring nodes of a network, the method comprising:
at said node, generating a pseudo-random number, wherein the pseudo-random number generator is a sequence number generated by a pseudo-random number generator (PRNG) applying a PRNG algorithm;
assigning said pseudo-random number as an address to identify said node with local uniqueness to other nodes in said network, wherein each node has an identical PRNG algorithm and seeds the identical PRNG algorithm with a different initial state; and
updating the address prior to each transmission by the network node by replacing a current sequence number by a next sequence number generated by the pseudo-random number generator.

* * * * *